United States Patent [19]

Matsumoto et al.

[11] Patent Number: 5,461,371
[45] Date of Patent: Oct. 24, 1995

[54] EXHIBIT EXPLAINING SYSTEM ACTIVATED BY INFRARED SIGNALS

[75] Inventors: Kanya Matsumoto; Keiichi Yamauchi, both of Saitama, Japan

[73] Assignee: Pioneer Electronic Corporation, Tokyo, Japan

[21] Appl. No.: 971,268

[22] Filed: Nov. 4, 1992

Related U.S. Application Data

[63] Continuation of Ser. No. 682,831, Apr. 9, 1991, abandoned.

[30] Foreign Application Priority Data

Jul. 27, 1990 [JP] Japan .................................. 2-199605

[51] Int. Cl.[6] .................................................. H04Q 7/00
[52] U.S. Cl. ............................... 340/825.25; 340/825.49; 340/825.72
[58] Field of Search .......................... 340/825.22, 825.25, 340/825.34, 825.54, 825.49, 825.69, 825.72, 825.35, 996, 825.44; 455/41, 604; 379/55, 56; 381/79, 80; 434/308, 318; 364/443; 359/142; 369/19, 24

[56] References Cited

U.S. PATENT DOCUMENTS

| | | | |
|---|---|---|---|
| 3,078,348 | 3/1963 | McIntosh | 455/41 |
| 4,330,780 | 5/1982 | Masaki | 340/825.44 |
| 4,336,524 | 6/1982 | Levine | 340/825.44 |
| 4,457,019 | 6/1984 | Szabo, Jr. et al. | 455/41 |
| 4,516,950 | 5/1985 | Berman et al. | |
| 4,673,932 | 6/1987 | Ekchian et al. | 340/825.35 |
| 4,824,375 | 4/1989 | Weiner | 381/79 |
| 4,827,419 | 5/1989 | Selby, III | 364/443 |
| 4,837,568 | 6/1989 | Snaper | 340/825.49 |
| 4,855,725 | 8/1989 | Fernandez | 434/308 |
| 4,855,842 | 8/1989 | Hayes et al. | |
| 4,973,952 | 11/1990 | Malec et al. | 340/825.49 |

FOREIGN PATENT DOCUMENTS

| | | |
|---|---|---|
| 0305124 | 3/1989 | European Pat. Off. . |
| 0389261 | 9/1990 | European Pat. Off. . |
| 2544536 | 10/1984 | France . |
| 2191620 | 12/1987 | United Kingdom ............ 340/996 |

OTHER PUBLICATIONS

"Help Wanted", Sound and Communications, Jul. 1980, pp. 16, 20, 21, Leon.

Primary Examiner—Donald J. Yusko
Assistant Examiner—Edwin C. Holloway, III
Attorney, Agent, or Firm—Sughrue, Mion, Zinn, Macpeak & Seas; Richard C. Turner; Raymond H. J. Powell, Jr.

[57] ABSTRACT

An exhibit explaining system includes transmitters and a portable information playback device. The transmitters transmits, in a wireless manner, identification signals respectively assigned to exhibits individually arranged at predetermined spatial intervals. The identification signal may be transmitted using infrared light or radio waves. When receiving the identification signal, the playback device reproduces and outputs prestored explanatory information as specified by the identification signal.

9 Claims, 10 Drawing Sheets

FIG. 11

| SOUND QUALITY LEVEL | MODULATION SYSTEM | SAMPLING FREQUENCY (kHz) | NUMBER OF QUANTIZATION (BIT) | BIT SAVING RATE (STEREO/MONAURAL) | AUDIO CHARACTERISTICS | |
|---|---|---|---|---|---|---|
| | | | | | DYNAMIC RANGE (dB) | FREQUENCY BAND (kHz) |
| CD DIGITAL AUDIO (SOUND QUALITY COMPARABLE TO THE 16-BIT PCM SYSTEM) | PCM | 44.1 | 16 | 1 | 98 | 20 |
| A  HI-FI (SOUND QUALITY COMPARABLE TO THE LP RECORD SYSTEM) | ADPCM | 37.8 | 8 | 1/2  1/4 | 90 | 17 |
| B  MID HI-FI (SOUND QUALITY COMPARABLE TO THE FM BROADCASTING SYSTEM) | ADPCM | 37.8 | 4 | 1/4  1/8 | 90 | 17 |
| C  SPEECH (SOUND QUALITY COMPARABLE TO THE AM BROADCASTING SYSTEM) | ADPCM | 18.9 | 2 | 1/8  1/16 | 50 | 8.5 |

EXHIBIT EXPLAINING SYSTEM ACTIVATED BY INFRARED SIGNALS

This is a Continuation of application Ser. No. 07/682,831 filed Apr. 9, 1991, abandoned.

BACKGROUND OF THE INVENTION

The present invention relates to an exhibit explaining system for automatically explaining exhibits, for example, pictures.

A variety of the exhibit explaining systems are known. In a typical exhibit explaining system, a cassette tape player, which is loaded with an endless cassette tape storing the speech explaining the exhibit, is placed near each exhibit. During use, when an exhibit viewer arrives in front of an exhibit, he pushes the start switch of the cassette player and listens to a one-time explanation of the exhibit.

It frequently occurs that when an exhibit viewer reaches the exhibit, other viewers, who arrived at an earlier time, are listening to the explanation. In this case, when the later viewer wishes to hear the portion of the explanation that was played prior to his arrival, he must wait until the explanation in progress ends. In this situation, the late arrival will either receive an unsatisfactory explanation of the exhibit or must wait until he can hear the next explanation from the beginning. For this reason, the explanation provided by the conventional exhibit explaining system is time consuming and inefficient.

SUMMARY OF THE INVENTION

Accordingly, an object of the present invention is to provide an exhibit explaining system which can automatically give an appreciator explanatory information on exhibits when he approaches the exhibit.

Another object of the present invention is to provide an exhibit explaining system which can automatically provide an exhibit viewer with explanatory information on an exhibit of interest when the viewer is within a predetermined distance of the exhibit.

Still another object of the present invention is to provide an exhibit explaining system which can automatically provide a plurality of exhibit viewers approaching an exhibit at different times with explanatory information, which starts for each viewer as that viewer approaches the exhibit.

These and other objects, features and advantages of the present invention are provided by an exhibit explaining system comprising a plurality of transmitting devices transmitting information signals and at least one information playback device, wherein each of the transmitting devices is associated with a corresponding one of a plurality of exhibits and wherein the exhibits are arranged at predetermined spatial intervals. Each transmitting device wirelessly sends an identification signal corresponding to a selected exhibit, which is received by the information playback device, which, in turn, provides explanatory information on the selected exhibit from information prestored in the playback device. The information playback device is portable. Accordingly, when an exhibit viewer, carrying the information playback device 60, moves and the playback device receives an identification signal corresponding to the selected exhibit, it automatically reproduces the explanatory information on the exhibit for the exhibit viewer, allowing him to individually, automatically and unrestrictedly receive the explanatory information. The transmitting devices advantageously can provide the identification signals as infrared light code signals. According to one aspect of the present invention, each of the transmitting devices is placed near a corresponding one of the exhibits.

The information playback device of the exhibit explaining system includes a receiving device for receiving the identification signals, a decoding device for decoding the identification signal, a playback device for playing back information corresponding to each of the exhibits stored in a memory device, and an output device. The output device can be one of an acoustic converter, an image display device and a printer. According to another aspect of the present invention, the memory device is a CD-ROM of the XA type.

BRIEF DESCRIPTION OF THE DRAWINGS

These and other objects, features and advantages of the invention will be apparent from the following description taken in connection with the accompanying drawings, in which like elements are denoted throughout by like or similar numbers, and in which:

FIG. 11 is a table showing various ADPCMs and their associated audio characteristics.

DETAILED DESCRIPTION OF THE PREFERRED EMBODIMENTS

Figure 1:
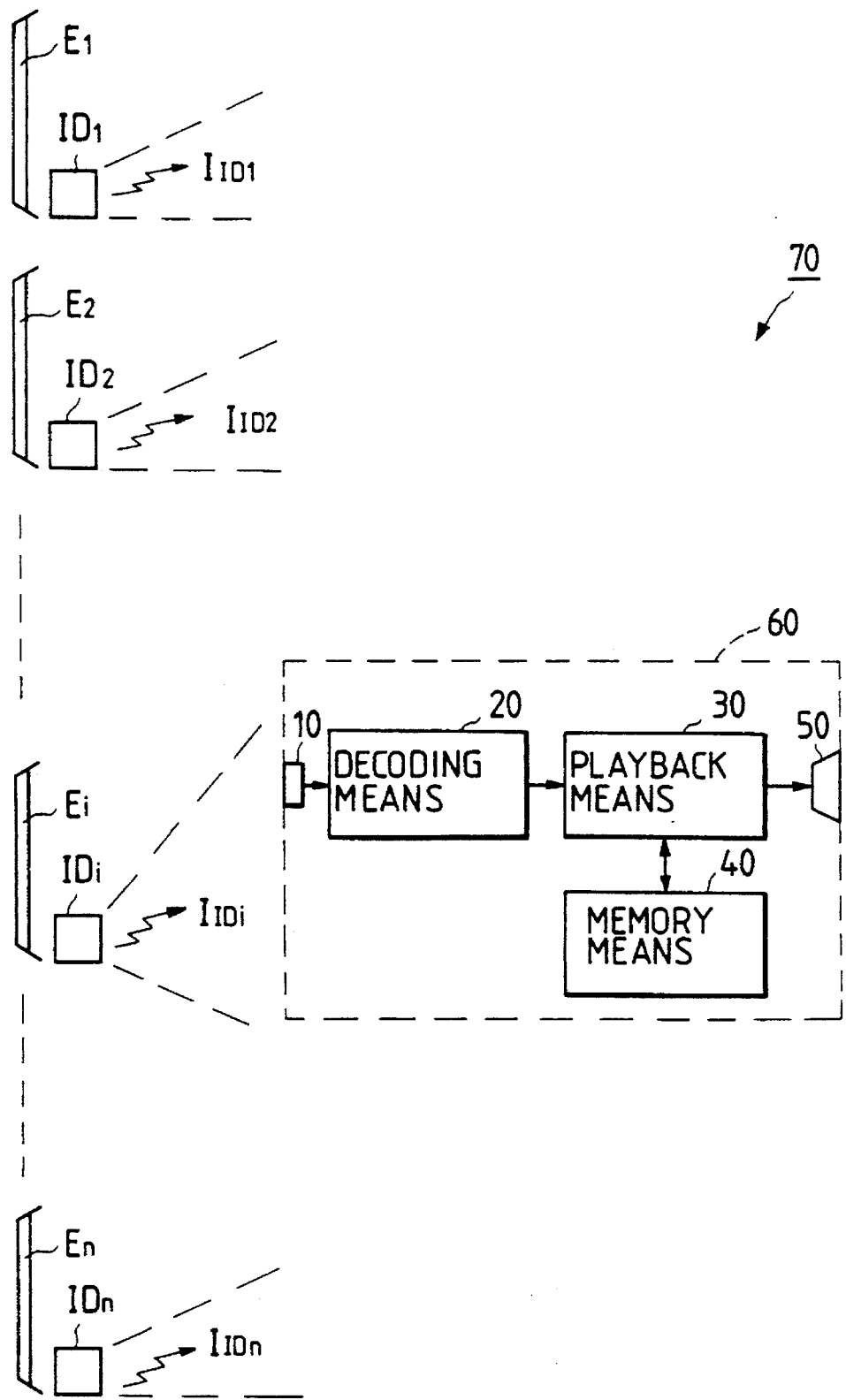
FIG. 1 is a schematic diagram showing the inventive concepts of the present invention.

Referring to FIG. 1, the exhibit explaining system 70 according to the present invention comprises a plurality of transmitting means $ID_1$ to $IDn$, each associated with a corresponding exhibit $E_i$ of exhibits $E_l$ to $E_n$, and information playback means 60. Each of the exhibits $E_l$ to $E_n$ are arranged with a predetermined spatial interval between them. As discussed in greater detail below, the transmitting means $ID_i$ of transmitting means $ID_1$ to $ID_n$ wirelessly sends a predetermined identification signal $I_{IDi}$ corresponding to the exhibit $E_i$. When the information playback means 60 receives the identification signal, it outputs explanatory information on the exhibit $E_i$ prestored therein. The information playback means 60 is portable. Accordingly, when an exhibit viewer moves carrying the information playback means 60 in his hand, if the playback means 60 catches the identification signal $I_{IDi}$, it automatically reproduces the explanatory information on the exhibit $E_i$ for the exhibit viewer. Accordingly, he can individually, automatically and unrestrictedly receive the explanatory information.

Figure 2:
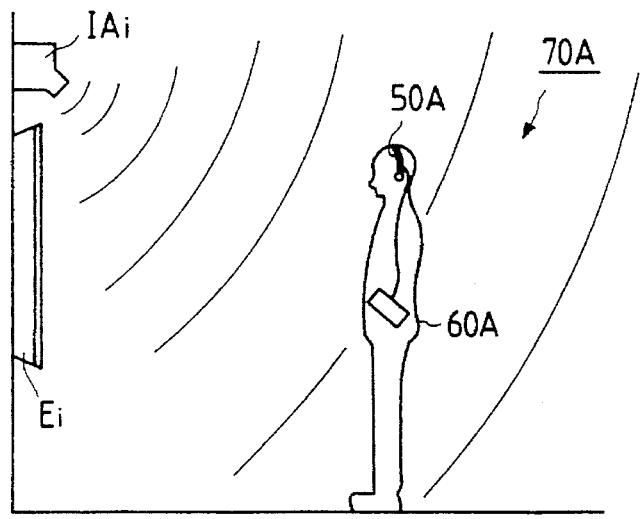
FIG. 2 is an explanatory diagram showing a first embodiment of an exhibit explaining system according to the present invention.
Figure 3:
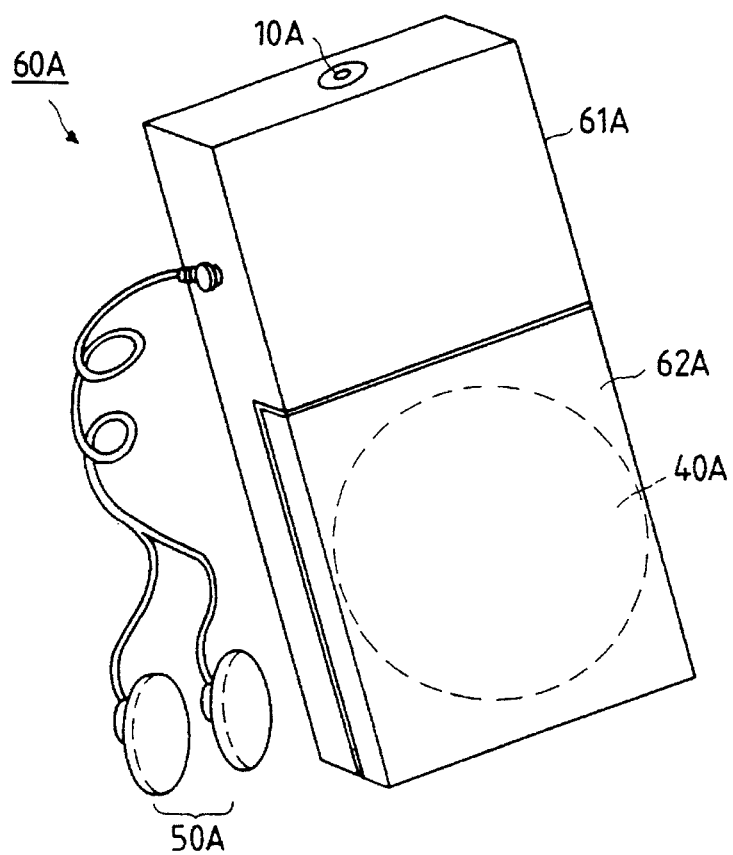
FIG. 3 is a perspective view showing an information playback device used in the exhibit explaining system of FIG. 2.
Figure 4:
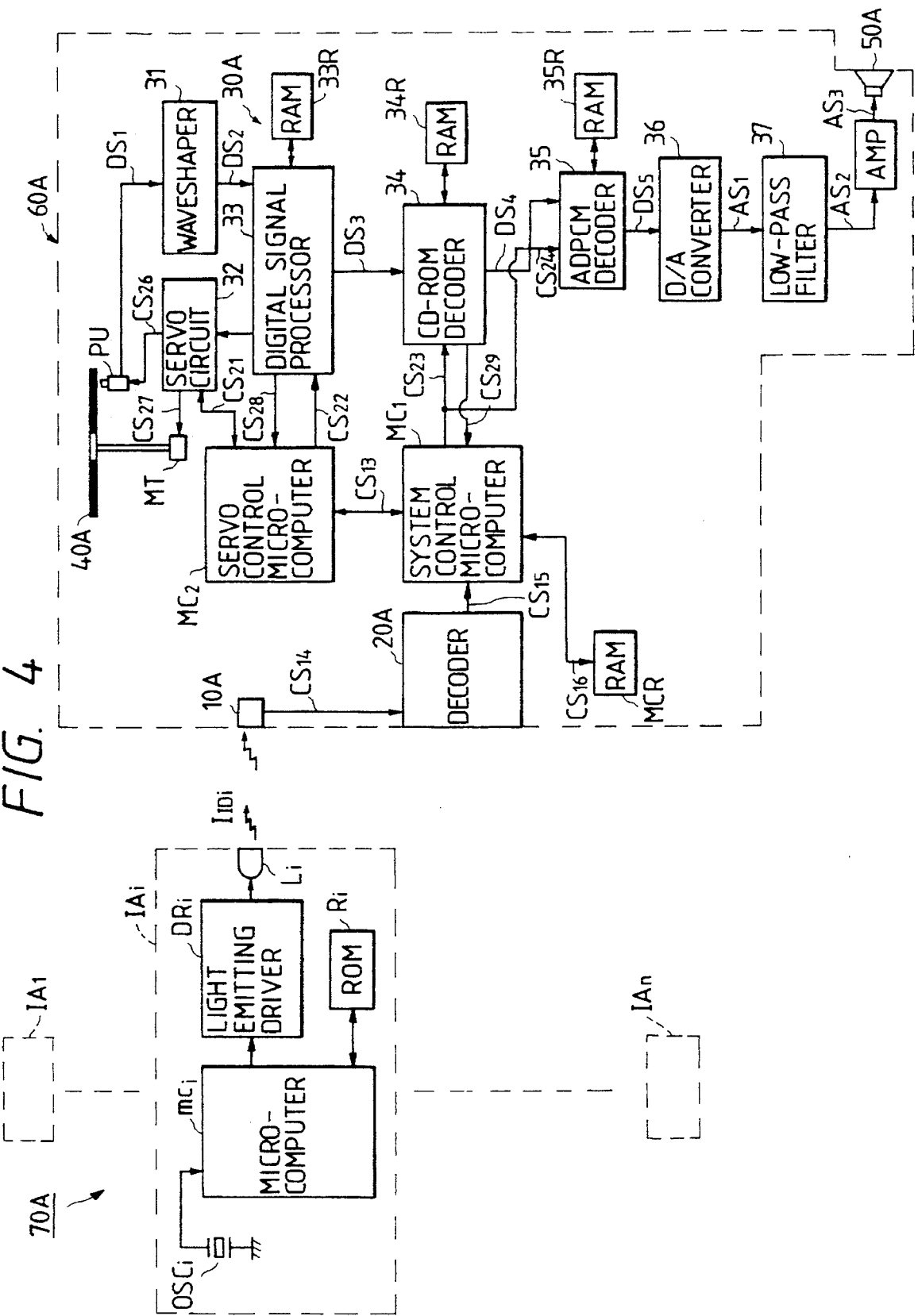
FIG. 4 is a block diagram showing the exhibit explaining system of FIG. 2.

FIGS. 2 through 4 cooperatively illustrate the exhibit explaining system according to a first embodiment of the present invention. FIG. 2 is a schematic diagram showing an exhibit explaining system 70A comprising a plurality of transmitters $IA_1$ to $IA_n$ providing transmitting means, and an information playback device 60A providing information playback means. Since each of the exhibit $E_i$ locations shown in FIG. 1 is identical, only a single exhibit $E_i$ and a single transmitting means $IA_i$ are illustrated in FIG. 2. The transmitters $IA_1$ to $IA_n$ are disposed near exhibits $E_1$ to $E_n$, i.e., pictures. An infrared code signal providing an identification signal, which is emitted from each of the transmitters $IA_1$ to $IA_n$, advantageously can be received in only the space near the exhibit, as shown.

The overall arrangement of information playback device 60A shown in FIG. 2 is illustrated in FIG. 3. The information playback device 60A is packed into a unitized body having the form of a case 61A. A photodiode 10A providing receiving means for receiving an infrared code signal is installed in the top end face of the case 61A as viewed in the drawing. A cover 62A is mounted on the front side of the case 61A, which advantageously can be opened and closed. Preferably, when cover 62A is opened, a CD-ROM disk 40A providing memory means for device 60A can be set therein. A headphone 50A acting as an acoustic converter, e.g., external output means, is connected to the side surface of the case 61A by way of a jack.

Preferably, a battery is provided as the power source of device 60A. A battery case (not shown), which allows a battery to be set therein or replaced with a new one, is provided on the rear side of the case 61A, for example. The case 61A is generally shaped like a thin box which can easily be held in the hand, and advantageously is made of light material, such as plastic, making device 60A easy to carry and manipulate.

FIG. 4 is a block diagram showing the exhibit explaining system 70A of FIG. 2. As shown in FIG. 4, the transmitter $IA_i$, which is identical to the transmitters $IA_1$ through $IA_n$, comprises a ceramic vibrator $OSC_i$, a microcomputer $mc_i$, a ROM $R_i$, a light emitting driver $DR_i$, and an infrared emitting diode $L_i$.

The information playback device 60A of FIG. 4 comprises a photodiode 10A, a decoder 20A acting as decoding means, a CD-ROM disk 40A acting as memory means, a playback unit 30A acting as playback means, and the ear speaker 50A acting as external output means or the acoustic converter.

Figure 9:
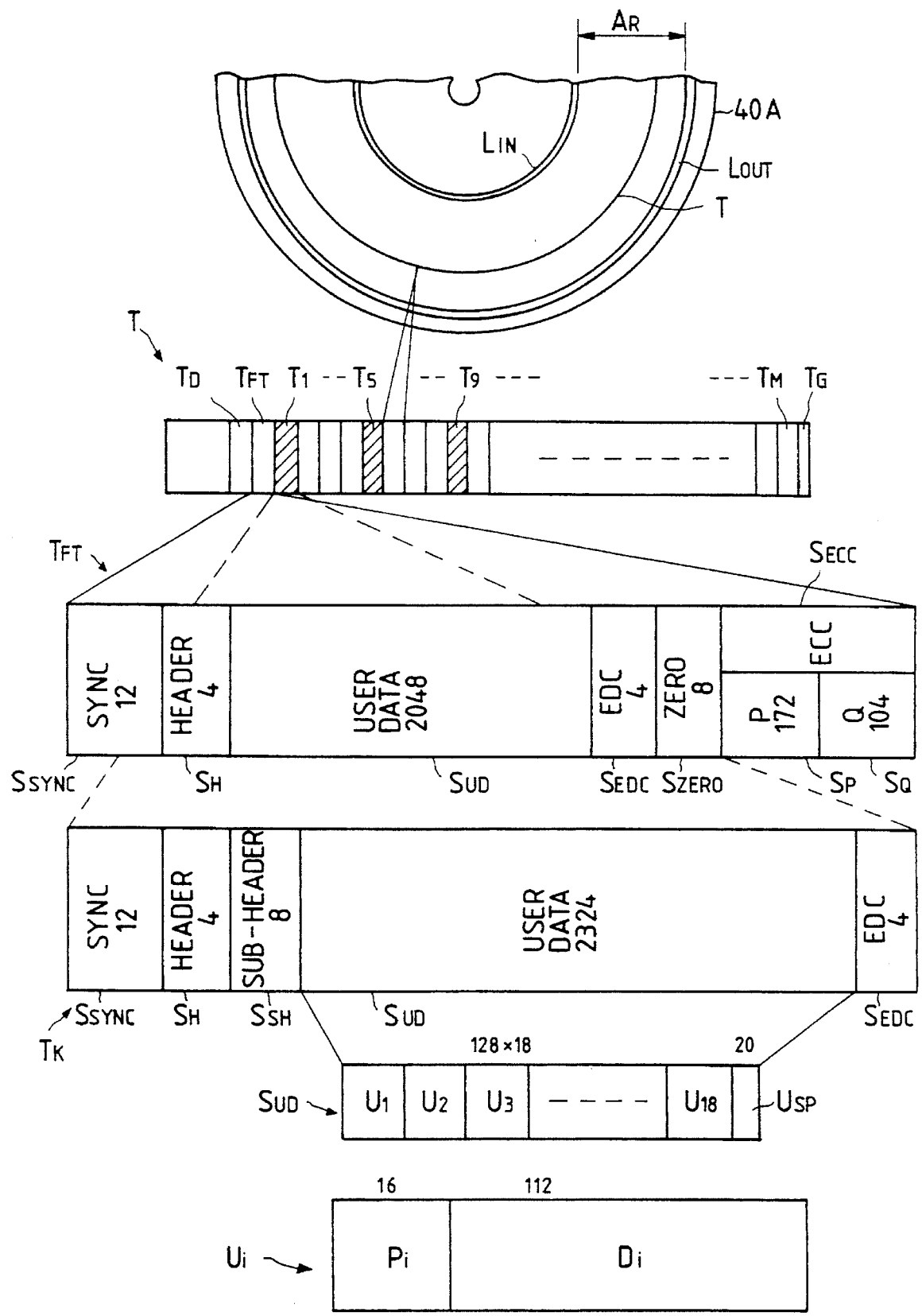
FIG. 9 is a diagram showing a data structure of a CD-ROMXA.

FIG. 9 is a diagram showing both a section of a CD-ROMXA disk 40A and the data structure of the CD-ROMXA.

The CD-ROM is a ROM (read only memory storing digital data) version of the compact disk (CD), which has already been used as a digital audio disk. Standards for the CD-ROM were established in 1985. CD-ROMs have come into use in a variety of fields. The following enumerated items are beneficial features of the CD-ROM: a large memory capacity, high reliability, good accessibility, ability of possibly copying a tremendous amount of information, and low cost of the playback system.

At present, two types of formats for the CD-ROM are practically used; a CD-I (CD-interactive) and a CD-ROMXA. Both types of the formats can record and play back speech/sound information and picture information, and employ an adaptive differential pulse code modulation (ADPCM) technique for speech/sound information. (See NIKKEI ELECTRONICS, May 15, 1989, (No. 473), pp. 195 to 200).

FIG. 9 shows a data sector structure of a memory area in the CD-ROMXA disk.

In the CD signal format, subcodes of 98 frames make up one block, which corresponds to 1/75 sec. One block of the CD can store data of 2352 bytes because $$44.1 \times 10^3 \times 16 \times 2 \times 1/75 \times 1/8 = 2352,$$

where $44.1 \times 10^3$ is the sampling frequency, 16 is the quantization bit number, 2 indicates the Left and Right channels of the stereo, 1/75 indicates time (sec.), and 1/8 is the bit-byte conversion rate.

In the CD-ROMXA, one block is used as one sector, each sector storing user data. The sector, in turn, comes in two varieties, Mode 1 and Mode 2, which mode is advantageously selected depending on the size of the user data area. Mode 2 is further categorized into Form 1 and Form 2.

In FIG. 9, the CD-ROMXA disk 40A includes a lead-in portion $L_{IN}$, a memory area $A_R$, and a lead-out portion $L_{OUT}$. In the memory area $A_R$, a track T includes a volume descriptor $T_D$, sectors $T_l$ to $T_m$, and a gap $T_G$. The volume descriptor $T_D$ is a portion of the track which stores an identification code indicating the CD-ROMXA, a flag, start-up directory, and the like. The volume descriptor $T_D$ is stored in Mode 1 or Mode 2, Form 1. The sectors $T_l$ to $T_m$ (e.g., $T_K$) for storing the image/sound signal are stored in Mode 2, Form 2, and includes a sync $S_{SYNC}$, a header $S_H$, a subheader $S_{SH}$, user data $S_{UD}$, and an error detection code $S_{EDC}$. The sync $S_{SYNC}$ consists of 12 bytes, and stores a signal to partition the sectors. The header $S_H$ consists of 4 bytes, 3 bytes of which are used for storing address data like the subcode of the CD, and the remaining byte for storing mode data. The subheader $S_{SH}$ consists of 8 bytes, and includes a final number $H_1$, a channel number $H_2$, a submode $H_3$, and coding information $H_4$. Each item $H_1$ to $H_4$ consists of one byte, which is written twice.

The user data $S_{UD}$ consists of 2324 bytes, and includes data units $U_1$ to $U_n$ and a spare unit $U_{SP}$. In the format shown in FIG. 9, the data units $U_1$ to $U_n$ each consists of 128 bytes, while the spare unit $U_{SP}$ consists of 20 bytes. Accordingly, n=18. The error detection code $S_{EDC}$ consists of 4 bytes. The data units $U_1$ to $U_{18}$ totally consist of 2304 bytes. The speech/sound signal is encoded according to the ADPCM scheme discussed below.

Figure 10A:
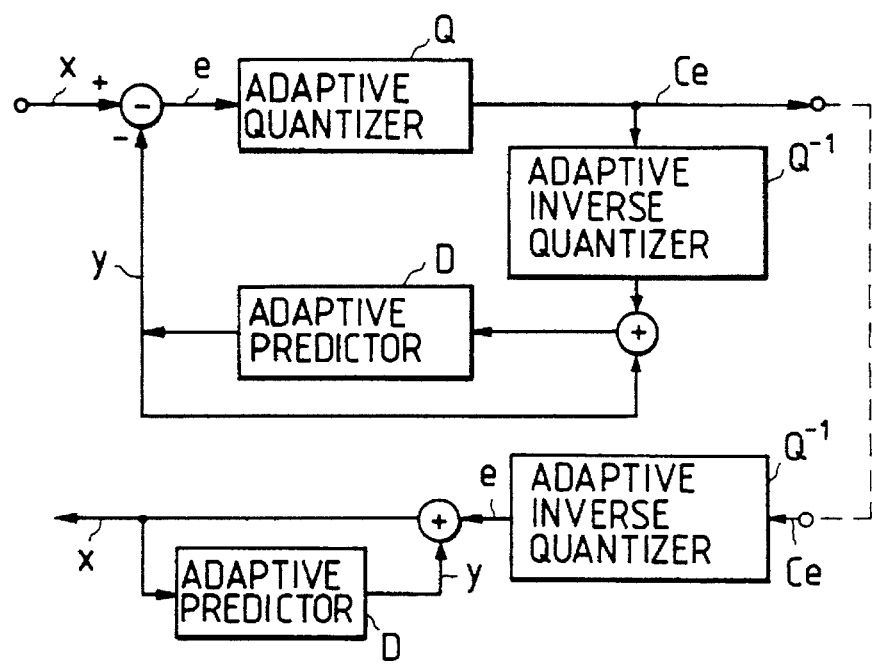
FIGS. 10A and 10B are an explanatory schematic diagram of the ADPCM circuitry and graphical illustrations of the signal forms produced by the ADPCM circuitry, respectively.
Figure 10B:
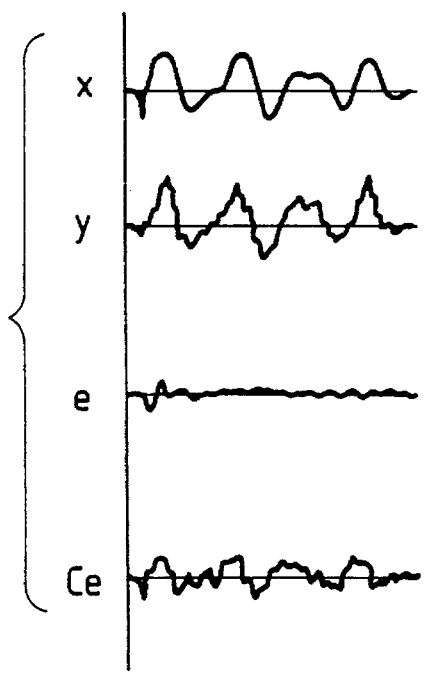

The principle of the ADPCM system is shown in FIGS. 10A and 10B. In the ADPCM system, an adaptive predictor D predicts the present input signal on the basis of a previous input signal. A subtractor $S_T$ produces a difference "e"=x−y, which is the difference between the predicted signal "y" and the present input signal "x". An adaptive quantizer Q quantizes the difference "e" by a plurality of bits and encodes it into a signal Ce. Playback or reproduction follows the reverse procedure. During reproduction, an adaptive inverse quantizer $Q^{-1}$ decodes the encoded signal Ce into the difference "e". Then, an adder $A_D$ adds the signal "y" predicted by the adaptive predictor D to the difference "e", and produces an output signal "x".

The ADPCM system is able to efficiently store audio data using a small number of bits. The bit saving rate (data reduction rate) also determines the audio characteristic. FIG. 11 tabulates the relationships between the ADPCMs and the audio characteristics. As seen from FIG. 11, at the level A, the bit saving rate is ½ for the stereo storage and ¼ for the monaural storage. In the level B, the bit saving rate is ¼ for the stereo storage and ⅛ for the monaural storage. In the level C, it is ⅛ for the stereo storage and ¹⁄₁₆ for the monaural storage. The bit saving rate of ¼, for example, indicates that the required memory capacity is ¼ as large as the conventional memory capacity, thus the remaining memory capacity of ¾ can be used for storing other data.

Referring to FIG. 9, the data unit $U_i$ consists of 128 bytes, and includes a sound parameter field $P_i$ and an ADPCM sample data field $D_i$. The sound parameter field $P_i$ consists of 16 bytes and, as shown in FIG. 10A, stores coefficients for a predictive filter of the adaptive predictor D of the ADPCM. The memory capacity of the ADPCM sample data field $D_i$ is 112 bytes, and this field stores the data sampled according to the ADPCM. For one sector, the total data capacity is 2016 bytes (=112×18). In the ADPCM, for the stereo storage in the level B, the number of bytes necessary for the storage is 504 bytes which results from $$37.8 \times 10^3 \times 4 \times 2 \times \tfrac{1}{75} \times \tfrac{1}{8} = 504,$$

where $37.8 \times 10^3$ is the sample frequency. When compared with ordinary memory system, the ADPCM system can store an amount of data four times as large as that of the ordinary memory system. In other words, the ADPCM system can store the speech/sound signals of 4 channels in a simple channel. In this case, the first channel is stored in the sectors $T_1, T_5, T_9, \ldots, T_{4h+1}$ where h is an integer of 0 or more. The second channel is stored in the sectors $T_2, T_6, T_{10}, \ldots, T_{4h+2}$; the third channel is stored in the sectors $T_3, T_7, T_{11}, \ldots, T_{4h+3}$; and the fourth channel is stored in the sectors $T_4, T_8, T_{12}, \ldots, T_{4h+4}$.

In this way, audio information such as explanatory information, after it is subjected to the PCM process, is stored in the ADPCM sample data field $D_i$. Image information and character information for additional explaining information can be stored using the whole data unit $U_i$ (128 bytes).

The file information table (FILE-TOC), providing a digital content information table, can be stored in the user data $S_{UD}$ area. In this case, the sector $T_{FT}$ storing the FILE-TOC can be one or more sectors following the volume descriptor $T_D$, as shown in FIG. 9. When used for the FILE-TOC, it is stored in Mode 1 or Mode 2, Form 1. Preferably, Mode 1 is used for storage. When one sector is used, its memory capacity capable of storing information in the form of the FILE-TOC is 2048 bytes as shown in FIG. 9. When N number of sectors are used, the memory capacity is 2048×N bytes. In the case of Mode 1, the subheader is not included, but a ZERO field $S_{ZERO}$ and an error correction code field $S_{ECC}$ are included substitutionally. The ZERO field $S_{ZERO}$ consists of 8 bytes and is RESERVED. The error correction code field $S_{ECC}$ consists of 276 bytes, and includes a parity field $S_p$ (172 bytes) and a parity Q field $S_Q$ (104 bytes). By using the FILE-TOC, the list of explanatory information may be displayed or desired explanatory information can be retrieved using the list.

Referring to FIG. 4, device 60A advantageously includes a playback unit comprising a spindle motor MT, an optical pick-up PU, a playback system, and a control system. The playback system includes a wave shaper 31, a digital signal processor 33, a RAM 33R, a CD-ROM decoder 34, a RAM 34R, an ADPCM decoder 35, a RAM 35R, a digital-to-analog (D/A) converter 36, a low-pass filter 47, and an amplifier AMP. The control system further includes a system control microcomputer $MC_1$, a servo control microcomputer $MC_2$, a servo circuit 32, and a RAM MCR.

The operation of the exhibit explaining system 70A thus arranged will be described.

In the transmitter $IA_i$ of transmitters $IA_1$ to $IA_n$, the ceramic vibrator $OSC_i$ generates a pulse wave signal which serves as a carrier wave signal of an infrared code signal $I_{IDi}$, and supplies it to the microcomputer $mc_i$. The microcomputer $mc_i$ reads an identification code associated with the exhibit $E_i$ out of the ROM $R_i$, generates the identification code signal and the pulse wave signal, generates an electrical signal from which the infrared code signal is derived, and finally applies the electrical signal to the light emitting driver $DR_i$. The light emitting driver $DR_i$ amplifies the electrical signal to drive the infrared emitting diode $L_i$, so that it constantly emits the infrared code signal $I_{IDi}$.

Figure 12:
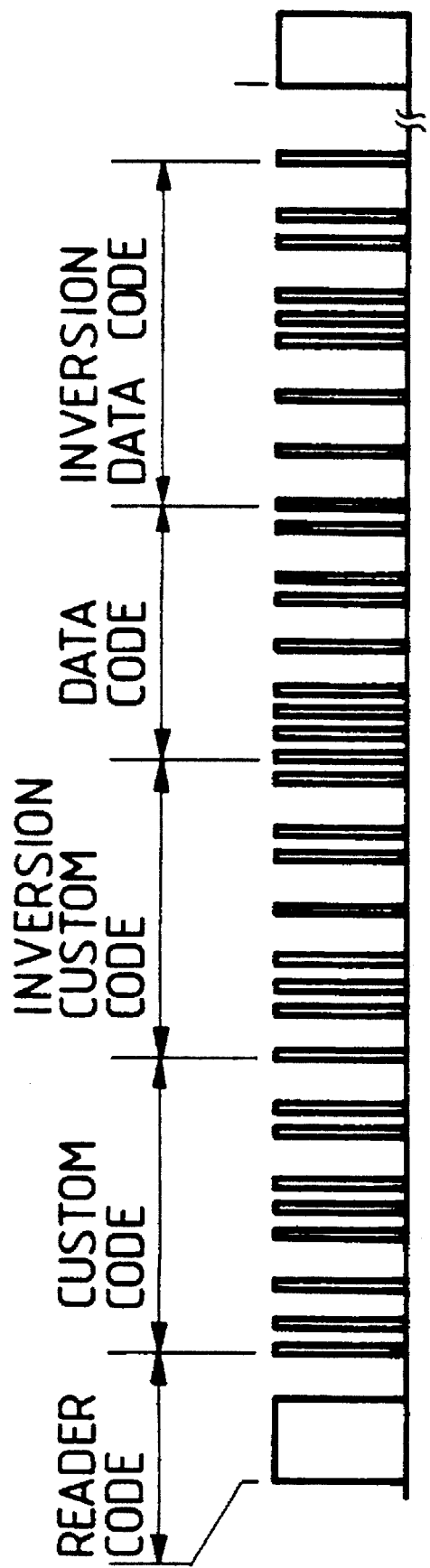
FIG. 12 is a diagram showing the format of an infrared code signal used in the exhibit explaining systems of FIGS. 1, 2 and 5.

The infrared code signal will be described with reference to FIG. 12. As shown in FIG. 12, a single infrared code signal generally consists of "reader code", "custom code", "inversion custom code", "data code", and "inversion data code" arranged in that order. The combination of those codes, the order of arrangement, and the number of bits used advantageously can be selected by a user. The "reader code" is used to send a message "Data will be transmitted to you" to the receiving side, device 60A. In response to the reader code, the receiving side checks to see if the instructions are directed to the receiving side itself. For this check, the "custom code" is used. The "data code" corresponds to the contents of the identification code of the present invention. The "inversion code" is used for error detection and consists of bits in inverted logic states.

The operation of the information playback device 60A will be described.

The information playback device 60A is placed in a specific space within which an infrared code signal emitted from a specific transmitter, for example, the transmitter $IA_i$, can be received. The photodiode 10A received an infrared code signal $I_{IDi}$, converts it into an electric signal $CS_{14}$, and sends it to the decoder 20A. The decoder 20A decodes the signal $CS_{14}$, and sends it as a signal $CS_{15}$ to the system control microcomputer $MC_1$. The system control microcomputer $MC_1$ decodes the signal $CS_{15}$, and recognizes that this signal is an identification code of the transmitter $IA_i$, corresponding to an exhibit $E_i$. After recognition, the system control microcomputer $MC_1$ retrieves the explanatory information on the exhibit $E_i$, which is stored in the CD-ROM disk 40A, and generates a control signal $CS_{13}$ to the servo control microcomputer $MC_2$ in order to play back the explanatory information. The servo control microcomputer $MC_2$ generates a control signal $CS_{21}$ to the servo circuit 32, causing it to perform the search/playback operation. It should be noted that it is necessary to first read the portion, called a TOC (table of contents), out of the lead-in $L_{IN}$ located in the lead portion of the disk 40A. The TOC corresponds to a table of contents, which lists the subcodes, such as the sync $S_{SYNC}$ and the header $S_H$ of the sector. Accordingly, if a subcode of the sector storing desired explanatory information is designated by system control microcomputer $MC_1$ and the servo control microcomputer $MC_2$, the servo circuit 32 applies the signal $CS_{26}$ to the optical pickup PU, and the signal $CS_{27}$ to the spindle motor MT, and moves the optical pickup PU to the sector position at a high speed to play back the explanatory information. To play back the information in the disk 40A, the CD-ROM disk 40A is turned by the spindle motor MT. The optical pickup PU reads a digital signal, which is expressed in the form of a train of pits, from the recording surface of the CD-ROM disk 40A. A digital signal $DS_1$, received by the pickup PU, is wave-shaped by the wave shaper 31, and then is applied as a signal $DS_2$ to the digital signal processor 33. In the signal processor 33, the edge of an EFM signal is detected using a reference clock that is generated by the crystal, to reproduce a train of data. A frame sync signal is detected from the data train, to exactly reproduce the structure of the frame data on the basis of the sync signal. The frame data is EFM modulated into 8-bit symbol data, which in turn is stored into the RAM 33R. The data stored in the RAM 33R is de-interleaved, processed for error correction, and transferred as a signal $DS_3$ to the CD-ROM decoder 34. In the CD-ROM decoder 34, the address is first searched using an absolute time of the subcode, the sync in the data is detected, and descrambled. Then, the header address is checked, and an intended sector is accessed. The user data obtained is subjected to error detection and error correction, and then it is applied as a signal $DS_4$ to the ADPCM decoder 35. The ADPCM decoder 35 includes an adaptive inverse quantizer and an adaptive predictor (not shown), and decodes the signal $DS_4$ into a digital signal and applies it as a decoded signal $DS_5$ to a D/A converter 36.

The D/A converter 36 converts the decoded signal $DS_5$ into an analog quantity, and applies it as a signal $AS_1$ to a low-pass filter 37. The filter 37 converts the signal $AS_1$ into an exact analog signal $AS_2$ and sends it to the amplifier circuit AMP.

The amplifier circuit AMP adjusts the frequency characteristics and the like for the analog signal $AS_2$ and amplifies it to a proper level, and applies the amplified signal to the headphone 50A. The headphone 50A reproduces the input signal $AS_3$ in the form of a output sound.

In the above operation, the system control microcomputer $MC_1$ can perform such a control that, even if the infrared code signal $I_{IDi}$ is consecutively picked up by the photodiode 10A, a new search operation is prohibited within a period of one playback time of the explanatory information on the exhibit $E_i$.

Figure 5:
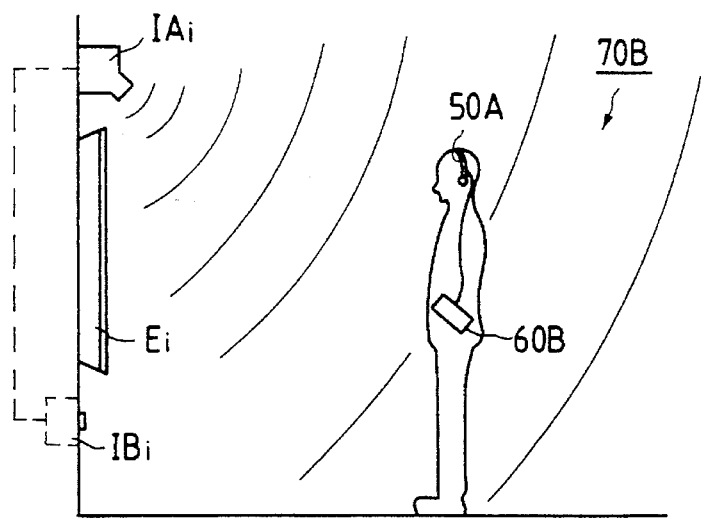
FIG. 5 is an explanatory diagram showing a second embodiment of an exhibit explaining system according to the present invention.

A second preferred embodiment of an exhibit explaining system according to the present invention will be described with reference to FIGS. 5 through 7. The arrangement of an exhibit explaining system 70B according to the second embodiment of the present invention is shown in FIG. 5, in which the exhibit explaining system 70B comprises a plurality of transmitters $IA_1$ to $IA_n$, input key sections $IB_1$ to $IB_n$, and an information playback device 60B. The plurality of transmitters $IA_1$ to $IA_n$ and the corresponding input key sections $IB_1$ to $IB_n$ comprise transmitting means. The information playback device 60B comprises information playback means. The remaining portions of the exhibit explaining system are the same as those of the system of FIG. 2.

Figure 6:
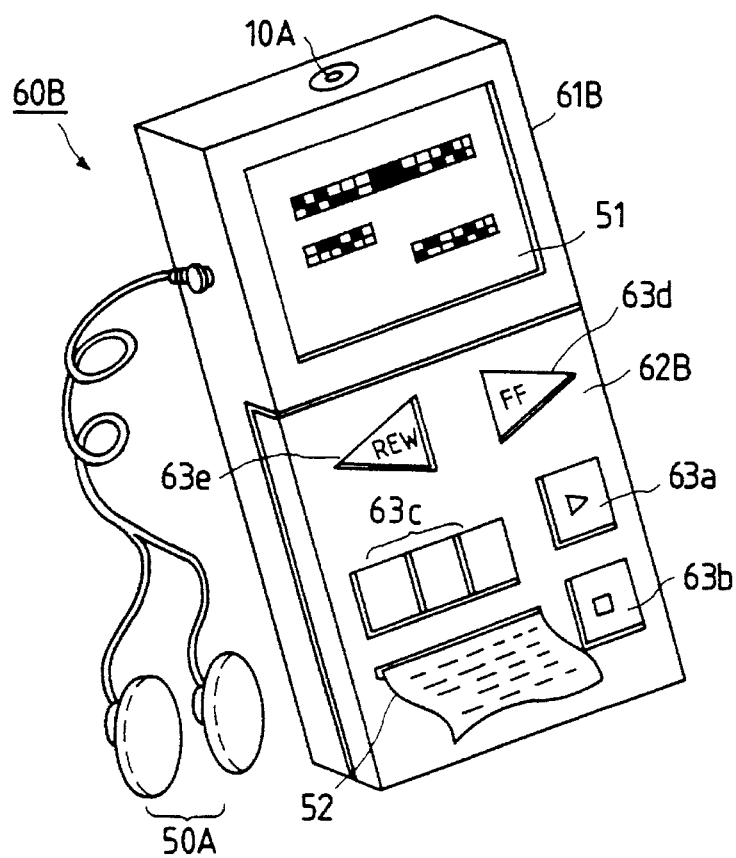
FIG. 6 is a perspective view showing an information playback device used in the exhibit explaining system of FIG. 5.

An appearance of the information playback device 60B is shown in FIG. 6. The information playback device 60B is different from that of FIG. 3 in that a liquid crystal display (LCD) panel 51 acting as an image display device, i.e., external output means, is provided in the upper portion of the front surface of a case 61B, control switches 63a to 63e are provided on the front surface, and a printer 52 providing hard copy output device is provided in case 61B. Reference numeral 63a designates a start switch; 63b a stop switch; 63c at least one mode select switch; 63d a fast forward switch; and 63e a rewind switch.

Figure 7:
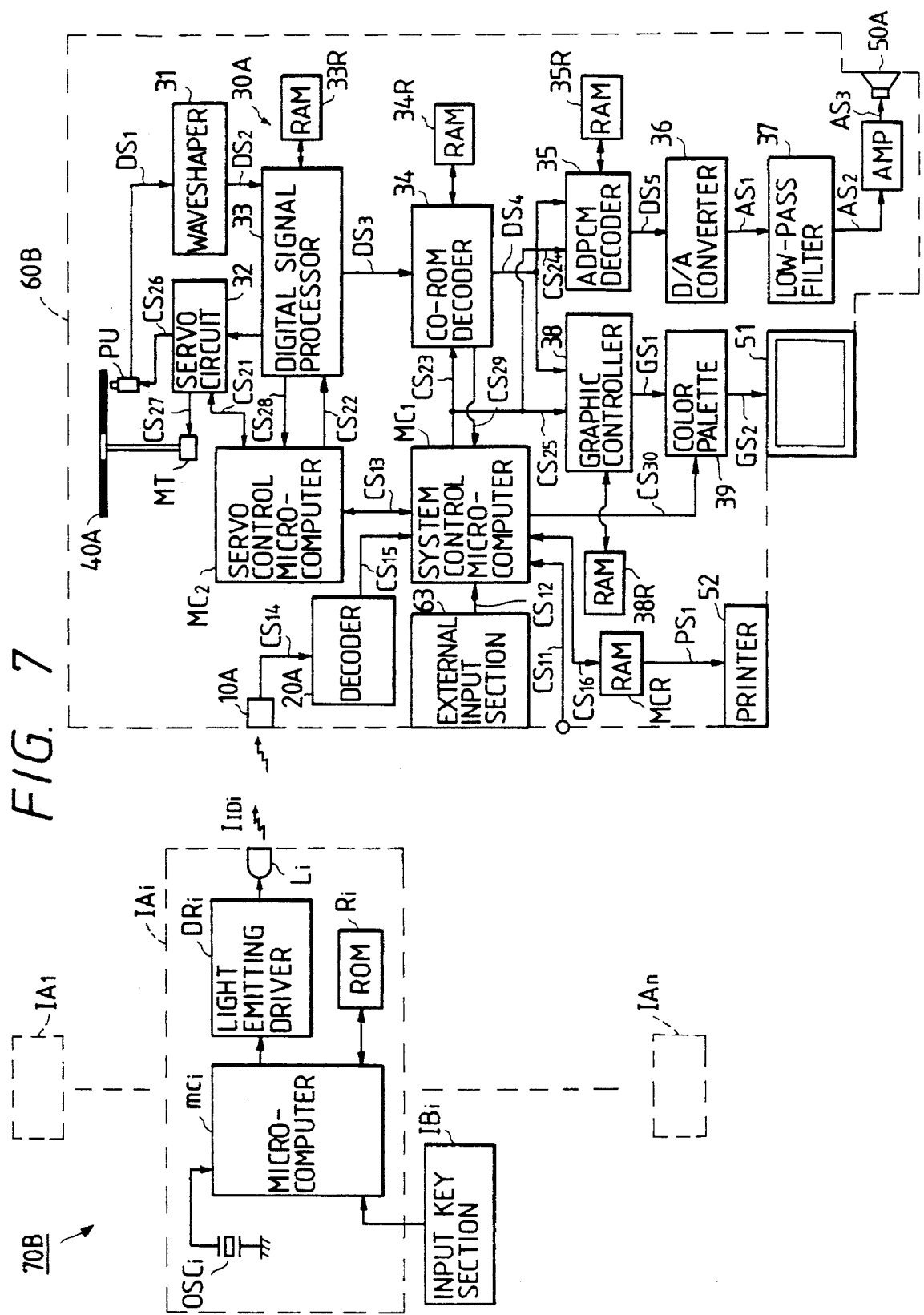
FIG. 7 is a block diagram showing the exhibit explaining system of FIG. 5.

A block diagram showing the internal components of the exhibit explaining system 70B shown in FIG. 5 is illustrated in FIG. 7.

In FIG. 7, the key section $IB_i$ coupled with the transmitter $IA_i$, is capable of externally altering the contents of an infrared code signal. The information playback device 60B of FIG. 7 is different from that 60A of FIG. 4 in that a reproduction unit 30B is different from that 30A, and the LCD panel 51 and the printer 52 are additionally used. The reproduction unit 30B of device 60B additionally includes a graphic controller 38, a RAM 38R, and a color palette 39. The remaining components are the same as those shown in FIG. 4.

The operation of the information playback device 60B thus arranged will be described. In the description, emphasis is placed on the operation of the device 60B, which is different from that of the information playback device 60A of FIG. 4.

The signal $DS_4$ output by the CD-ROM decoder 34 is also transferred to the graphic controller 38. When image information is stored in the user data $S_{UD}$ of the ROM disk 40A, the graphic controller 38 picks up an image signal based on the image information contained in the signal $DS_4$, and outputs a graphic signal $GS_1$, which is provided to the color palette 39. The color palette 39 adjusts the color of the graphic signal $GS_1$ or applies an additional color to the signal, and transfers it as a graphic signal $GS_2$ to the LCD panel 51. The LCD panel 51 visually outputs the graphic signal $GS_2$ in the form of a picture or an image.

When character information is stored in the CD-ROM disk 40A, the CD-ROM decoder 34 transfers a character signal $CS_{29}$ to the system control microcomputer $MC_1$, and is stored in the RAM MCR temporarily. To print out characters, the RAM MCR sends a signal $PS_1$ to the printer 52 which then prints out characters.

Figure 8:
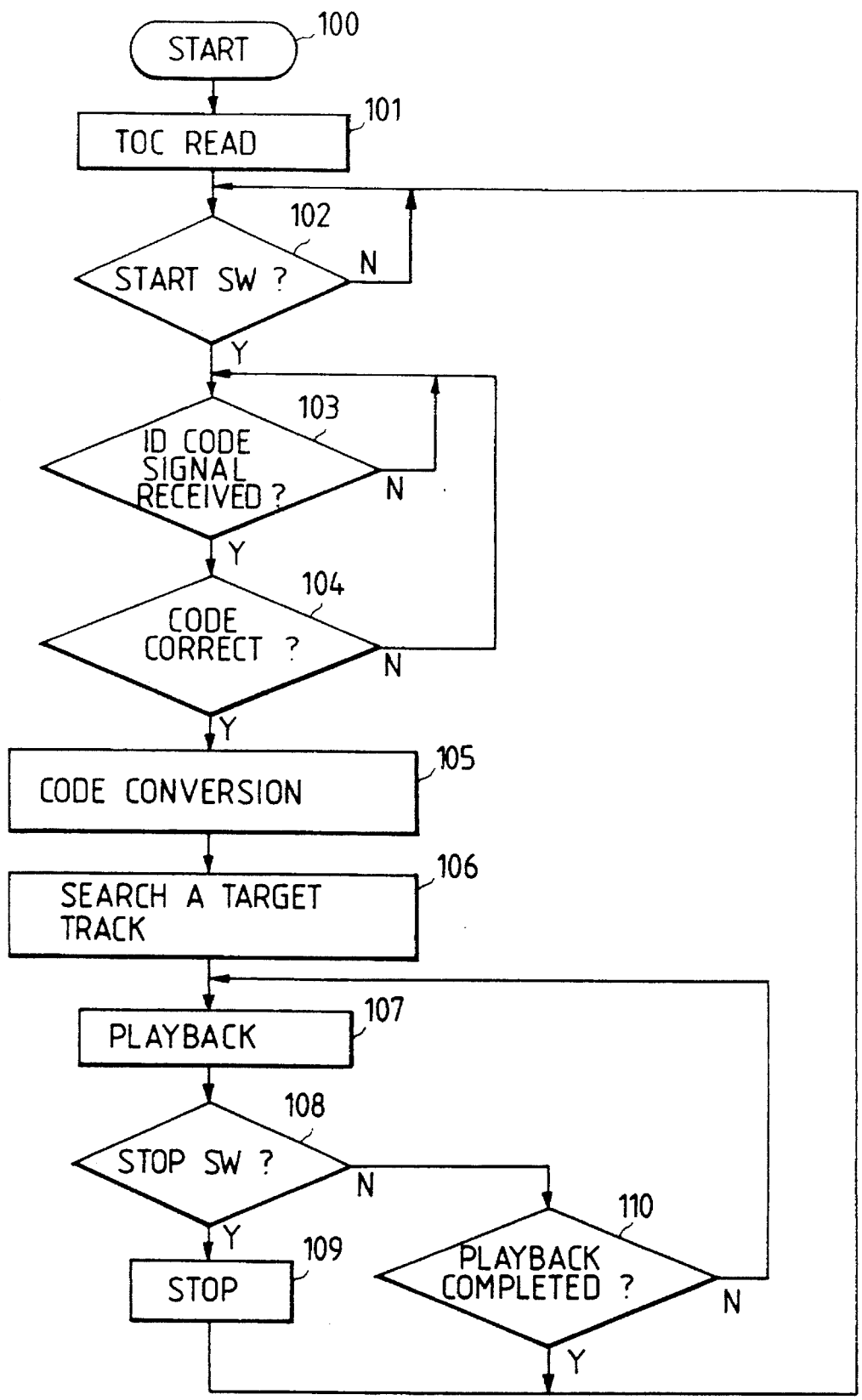
FIG. 8 is a flowchart of a control program used in the exhibit explaining system of FIG. 7.

A flowchart of a program to control the operation of the information playback device 60B is shown in FIG. 8.

In FIG. 8, the information playback device 60B starts in step 100, and reads TOC out of the CD-ROM disk 40A (step 101). From the TOC, the device 60B recognizes explanatory information in the CD-ROM 40A, and its address. In step 102, the device checks to see if the start switch has been turned on. As shown in FIG. 6, the device 60B is provided with the start switch 63a. It will be appreciated that the information playback device 60A of the first embodiment automatically starts to operate immediately after it receives the infrared code signal. The playback device 60B of the second embodiment does not operate till the start switch 63a is operated. With provision of the start switch, an exhibit viewer can operate the playback device only when he desires an explanation of the exhibit. If the start switch 63a is in an ON state, a step 103 is executed, in which the playback device checks to see if the infrared code signal has been received. In the next step 104, the device checks to see if the code is correct. If it is correct, the device determines which exhibit explanatory information is related to the code by using conversion table stored in the ROM (not shown) of the system control microcomputer $MC_1$ (step 105). Then, the device searches and finds a track storing the exhibit explanatory information based on the TOC information (step 106). After the track is found, the explanatory information is played back (step 107). During playback, the device checks to see if the stop switch is turned on (step 108). The information playback device 60B is provided with the stop switch 63b as shown in FIG. 6. It will be apparent that in the information playback device 60A of the first embodiment, it is impossible to stop the device reproducing the explanation of the exhibit information. In the case of the information playback device 60B of the second embodiment, the exhibit viewer can stop the device from reproducing the explanation when he so desires (step 109). After the explanation ends, the device returns to step 102 and is in a stand-by mode.

The information playback device 60B, as shown in FIG. 6, is provided with the mode select switch 63c, which advantageously can be used to select a language mode. By operating the switch, the information playback device can select any of Japanese, English and other languages to explain the exhibit information. Another mode select 63c switch may be used as an outline/detail select switch for selecting an outline explanation or a detailed explanation. An additional mode select function may be used to select a level of explanation according to the viewer's knowledge on the exhibit.

In the exhibit explaining system 70B, the contents of the infrared signal providing the infrared code signal can be altered externally by using the key input sections $IB_1$ to $IB_n$. With provision of the key sections, when an exhibit is changed, a code associated with the new exhibit can be set in place of that of the old exhibit.

In the embodiments described above, pictures were used for the exhibits. It will be appreciated that other exhibits such as found at conventional trade fairs, automobile fairs, zoos and botanical gardens can advantageously employ the exhibit explaining the system of the present invention.

Infrared signals were used for a medium for transmitting the identification code, but the medium may be ordinary radio waves. The identification signals, which were expressed by using codes, may be expressed by another means. For example, a frequency band is divided into a plurality of frequencies, and those are multiplexed. The frequencies are allocated to the exhibits, respectively. Each information playback device is provided with a tuner for selecting the frequencies. A user operates the tuner to select the frequency to pick up the explanatory information. In this case, since the identification signals are multiplexed, the transmitter is not always placed near its associated exhibit therewith.

Furthermore, the CD-ROMXA disk as the memory means can advantageously be replaced by other suitable means, for example, other types of CD-ROMs, CD-I, normal compact disks, or digital audio tape (DAT), IC cards, and other types of read only memories.

As seen from the foregoing description, according to the invention, a viewer can automatically and individually receive the information explaining the exhibits. He can hear the desired portion of the explanatory information at his convenience and to a satisfactory degree.

Since the information storing device is a digital storage device, such as the CD-ROMXA disk, a large amount of explanatory information can be stored and access to the disk-stored data is quick. Hence, the exhibit explanatory information can be reproduced efficiently and quickly.

While there has been described what is at present considered to be the preferred embodiments of the present invention, it will be understood that various modifications may be made therein, and it is intended to cover in the appended claims all such modifications as fall within the true spirit and scope of the invention.

What is claimed is:

1. An exhibit explaining system comprising:
   transmitting means for transmitting a plurality of infrared code signals, each of said code signals being respectively assigned to a corresponding one of a plurality of exhibits, said exhibits being individually arranged at predetermined spatial intervals; and
   portable information playback means for providing explanatory information upon receiving at least one of said infrared code signals, said portable information playback means including memory means for prestoring explanatory information, and said portable information playback means picking up and outputting the prestored explanatory information specified by said at least one of said code signals, said portable information playback means comprising:
   receiving means for receiving said infrared code signals;
   decoding means for decoding a received one of said infrared code signals received by said receiving means;
   said memory means for storing explanatory information on individual ones of said exhibits respectively corresponding to said infrared code signals;
   playback means for reading from said memory means said explanatory information corresponding to said received one of said infrared code signals that is decoded by said decoding means, and for playing back said explanatory information; and
   output means for outputting said explanatory information played back by said playback means, wherein said output means is a printer.

2. The exhibit explaining system according to claim 1, wherein said transmitting means is placed in close proximity to each of said exhibits and transmits said infrared code signals at such a signal intensity as to allow said information playback means to receive said code signals only within a specific space surrounding each of said exhibits corresponding to each of said code signals.

3. An exhibit explaining system comprising:
   transmitting means for transmitting a plurality of infrared code signals, each of said code signals being respectively assigned to a corresponding one of a plurality of exhibits, said exhibits being individually arranged at predetermined spatial intervals; and
   portable information playback means for providing explanatory information upon receiving at least one of said infrared code signals said portable information playback means including memory means for prestoring explanatory information, and said portable information playback means picking up and outputting the prestored explanatory information specified by said at least one of said code signals, said portable information playback means comprising:
   receiving means for receiving said infrared code signals;
   decoding means for decoding a received one of said infrared code signals received by said receiving means;
   said memory means for storing explanatory information on individual ones of said exhibits respectively corresponding to said infrared code signals;
   playback means for reading from said memory means said explanatory information corresponding to said received one of said infrared code signals that is decoded by said decoding means, and for playing back said explanatory information; and
   output means for outputting said explanatory information played back by said playback means,
   wherein said memory means is a CD-ROM of the XA type.

4. The exhibit explaining system according to claim 3, wherein said transmitting means is placed in close proximity to each of said exhibits and transmits said infrared code signals at such a signal intensity as to allow said information playback means to receive said code signals only within a specific space surrounding each of said exhibits corresponding to each of said code signals.

5. The exhibit explaining system according to claim 3, wherein said output means is an acoustic converter.

6. The exhibit explaining system according to claim 3, wherein said output means is an image display device.

7. The exhibit explaining system according to claim 3, wherein said output means is a printer.

8. An exhibit explaining system comprising:

transmitting means for transmitting in a wireless manner only a plurality of identification signals respectively assigned to a plurality of exhibits individually arranged at predetermined spatial intervals; and portable information playback means for receiving only at least one of said identification signals, said playback means including a CD-ROM for prestoring explanatory information, and said playback means reproducing and outputting only the prestored explanatory information as specified by said at least one of said identification signals.

9. The exhibit explaining system according to claim 8, wherein said transmitting means is placed in close proximity to each of said exhibits and transmits each of said identification signals at such a signal intensity as to allow said information playback means to receive each of said identification signals only within a specific space surrounding the exhibit corresponding to each of said identification signals.

\* \* \* \* \*